(12) United States Patent
Yao et al.

(10) Patent No.: US 12,153,507 B2
(45) Date of Patent: *Nov. 26, 2024

(54) DYNAMIC ALLOCATION AND USE OF IMS PROCESSING RESOURCES

(71) Applicant: DISH Wireless L.L.C., Englewood, CO (US)

(72) Inventors: Kevin Yao, Cheyenne, WY (US); Prashant Raghuvanshi, Parker, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/509,132

(22) Filed: Nov. 14, 2023

(65) Prior Publication Data

US 2024/0086296 A1 Mar. 14, 2024

Related U.S. Application Data

(63) Continuation of application No. 17/459,268, filed on Aug. 27, 2021, now Pat. No. 11,853,190.

(51) Int. Cl.
| | |
|---|---|
| *G06F 11/00* | (2006.01) |
| *G06F 8/61* | (2018.01) |
| *G06F 11/30* | (2006.01) |
| *G06F 11/34* | (2006.01) |
| *G06F 11/36* | (2006.01) |

(Continued)

(52) U.S. Cl.
CPC ............ *G06F 11/3409* (2013.01); *G06F 8/61* (2013.01); *G06F 11/3006* (2013.01); *G06F 11/3664* (2013.01); *G06F 11/3684* (2013.01); *H04L 41/16* (2013.01); *H04L 43/08* (2013.01); *H04L 67/1031* (2013.01); *H04W 24/04* (2013.01)

(58) Field of Classification Search
CPC ............ G06F 11/3006; G06F 11/3409; G06F 11/3664; G06F 11/3684
See application file for complete search history.

(56) References Cited

U.S. PATENT DOCUMENTS

| | | |
|---|---|---|
| 2016/0308958 A1 | 10/2016 | Navali et al. |
| 2019/0102213 A1 | 4/2019 | Yousaf et al. |

(Continued)

FOREIGN PATENT DOCUMENTS

| | | |
|---|---|---|
| WO | 2020177869 A1 | 9/2020 |

OTHER PUBLICATIONS

International Search Report and Written Opinion, mailed Dec. 6, 2022, for International Patent Application No. PCT/US2022/041063. (18 pages).

*Primary Examiner* — Joshua P Lottich
(74) *Attorney, Agent, or Firm* — Seed IP Law Group LLP

(57) ABSTRACT

According to the present disclosure various network functions are dynamically instantiated on a selected data center to utilize the most efficient and rapid resources available. An analytic module and a data lake receive performance data from the various data centers of a cellular network, such as a Regional Data Center, a National Data Center and an Edge Data Center. The analytic module will analyze the received performance data and apply artificial intelligence and machine learning to determine current resource use and estimate future resources available on various data centers of the cellular network. The appropriate data center is then selected to perform a particular network function.

17 Claims, 5 Drawing Sheets

(51) Int. Cl.
 H04L 41/16 (2022.01)
 H04L 43/08 (2022.01)
 H04L 67/1031 (2022.01)
 *H04W 24/04* (2009.01)

(56) References Cited

U.S. PATENT DOCUMENTS

| | | |
|---|---|---|
| 2019/0140933 A1 | 5/2019 | Guim Bernat et al. |
| 2020/0021502 A1 | 1/2020 | Bernat |
| 2020/0104184 A1 | 4/2020 | Subramanian et al. |
| 2020/0151014 A1 | 5/2020 | Sukhi et al. |
| 2021/0135957 A1 | 5/2021 | Thakkar et al. |
| 2021/0144517 A1 | 5/2021 | Guim Bernat et al. |
| 2023/0040842 A1 | 2/2023 | Kita et al. |

DYNAMIC ALLOCATION AND USE OF IMS PROCESSING RESOURCES

BACKGROUND

Technical Field

This disclosure is in the field of cellular network management, and more particularly, in the field of managing the use of resources in a cellular network to carry out a number of network functions at a selected data center.

Description of the Related Art

Cellular networks are ubiquitous in today's world. Currently most cellular networks, such as the various versions of 3G, LTE, 4G, and 5G follow the 3GPP model, with a hierarchical design comprising many radio towers, many edge data centers, a number of regional data centers and a few national data centers that serve the various regional data centers spanning a large geographical area. Various network functions, as defined by 3GPP, run on these data centers. Different network functions provide different utility to the cellular network. For example, the network function User Plane Function (UPF) provides packet routing and data access to a user equipment such as a cellphone. UPF is typically run at an edge data center because it interacts with a user equipment directly. For example, Unified Data Management (UDM) provides subscription management and encryption. UDM is typically run at a national data center because it handles many users spanning a large geographical area. It also requires more computational power which is not always available at regional data centers. The fixed assignments of the various network functions at each data center give rise to deficiency. Data centers designed to run certain network functions at peak traffic will have surplus resources during low traffic times. Localized traffic may impact national network performance if it overloads a network function running on a national data center.

BRIEF SUMMARY

According to the present disclosure various network functions are dynamically instantiated on a selected data center to utilize the best resources available. The resource-to-use selection is carried out using estimations enabled by artificial intelligence (AI) and machine learning.

According to one embodiment, an analytic module and a data lake receive performance data from the various data centers of a cellular network. The analytic module will analyze the received performance data and apply artificial intelligence and machine learning to determine current resource use and estimate future resources available on various data centers of the cellular network. The analytic module then selects appropriate network functions to run on selected data center. The analytic module, interacting with an execution transfer module will instantiate the selected network function on the selected data center. By selecting the appropriate data center to run a selected network function, the deficiency described above can be mitigated. For example, a network function typically run in a national data center can be instantiated in a regional data center or an edge data center in response to sudden high traffic at the national data center and recognizing lower traffic at a particular edge data center.

A method of load balancing various network functions in a cellular network includes receiving performance data from various data centers in the network and instantiating selected network functions on selected data centers using analytic estimates of resources available in the future on those data centers. The received performance data is stored in a data lake. The stored performance data and the received performance data as they occur are analyzed using artificial intelligence and machine learning. The analyzed results are used to select an appropriate network function to run on a selected data center where the resources available there in the future are most favorable. The selected network function is instantiated on the selected data center to utilize the resources available.

DETAILED DESCRIPTION

Figure 1:
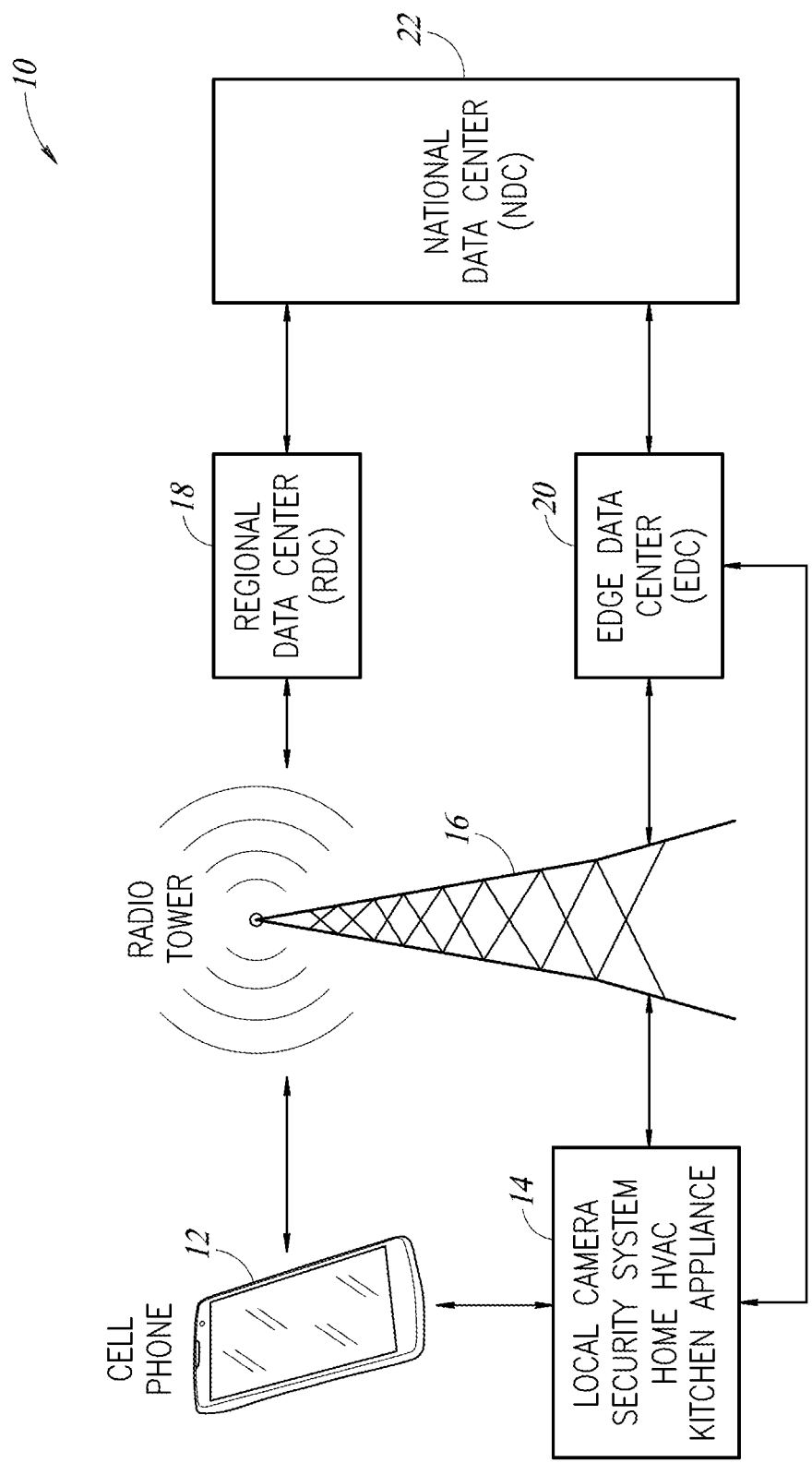
FIG. 1 is a system diagram of a typical 3GPP cellular network.

FIG. 1 shows a 3GPP cellular network 10, which is known by persons skilled in the art and is defined by 3GPP standard. The cellular network 10 comprises a plurality of user equipment including, for example, a cellphone 12 or a plurality of smart appliances 14 such as a local camera, a home security system, a home HVAC system, or a smart refrigerator; a radio tower 16 coupled wirelessly to the plurality of user equipment; an edge data center (EDC) 20 coupled with the radio tower 16 and a local Internet of Things (IoT) 14 having, in one example, various smart applications and appliances 14 that communicate via the internet or private network; a regional data center (RDC) 18 coupled to the radio tower 16; and a national data center (NDC) 22 coupled to the RDC 18 and EDC 20.

Figure 2:
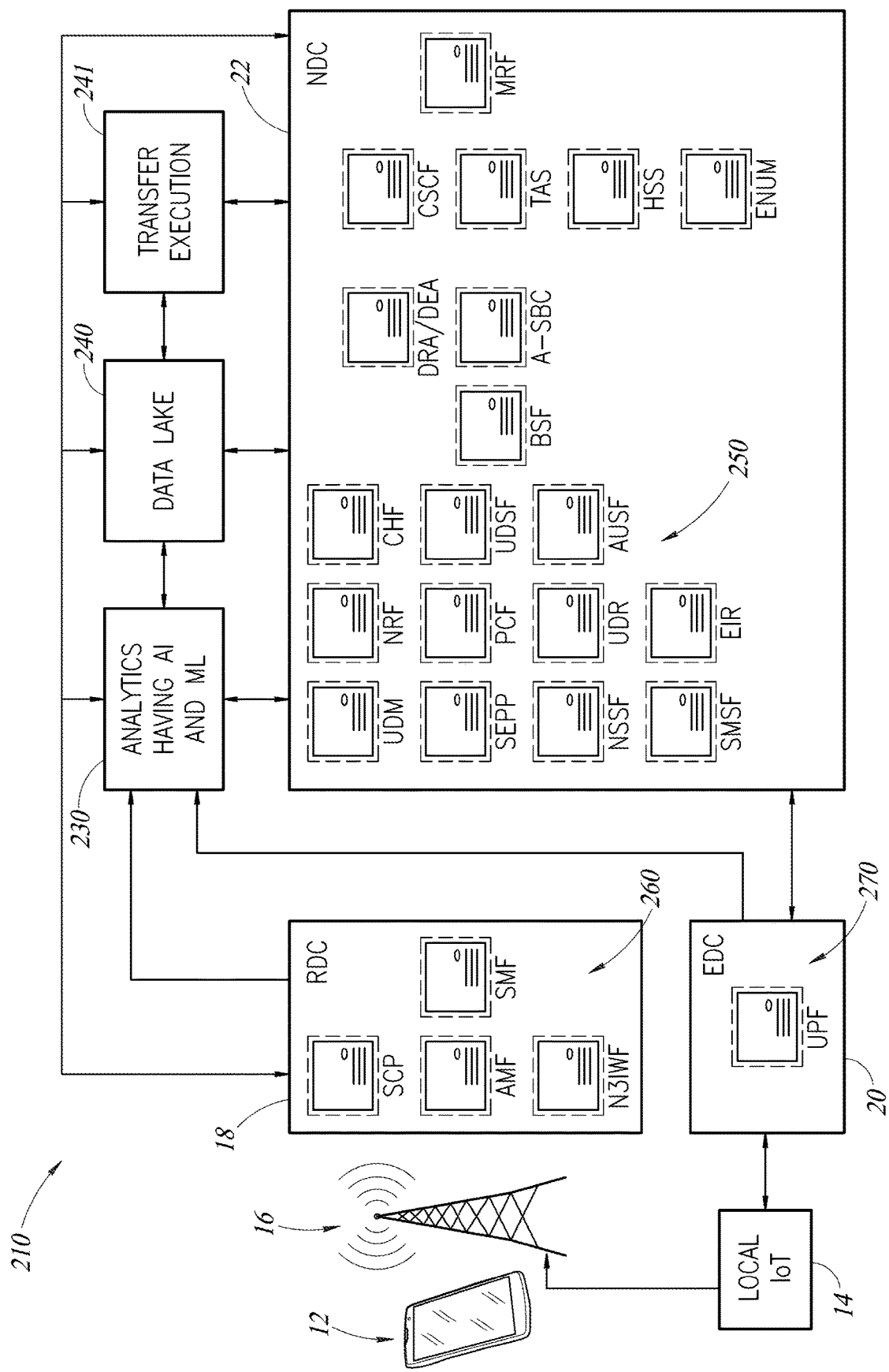
FIG. 2 is a detailed system diagram of a load balancing of cellular network according to principles of the present disclosure.

FIG. 2 shows a detailed system diagram of an embodiment of the present disclosure showing load balancing an IMS cellular network system 210. The inventive cellular network system 210 according to present disclosure further comprises: an analytics module 230 coupled to the NDC 22, the RDC 18, and the EDC 20, a data lake 240 coupled to the analytic module 230, the NDC 22, the RDC 18, and the EDC, 20 and a transfer execution module 241 coupled to the analytics module 230 and the data lake 240. In some embodiments, the transfer execution module 241 can be directly coupled to various data centers, such as the EDC 20, the RDC 18 and/or the NDC 22. Alternatively, the transfer execution module 241 can be within the analytics module 230 and be considered part of that module. Various network functions are set in advance to run on different data centers to operate the cellular network system 210. Some network functions 270, for example, such as UPF, are set up by the system to be run on the EDC 20 as the default data center selection. Some network functions 260, for example, SMF and AMF, set up by the system run on the RDC 18 as the default data center selection. The majority of network functions 250, for example, UDM, NRF, or CHF, are selected to be run on the NDC 22 as the default data center selection.

In a standard cellular network, there will typically be from a few to several million EDCs 20, several thousand or more RDCs 18, and a dozen or fewer NDCs 22. A large number EDC's are being added on a regular basis so the number available will continue to grow and expand, while a modest number of RDCs are being added. The number of NDCs is relatively constant, with only a few being added. Instead of adding new NDCs more resources are needed based in increased growth of the cellular network, it is common to add more processors and computing power to the current NDCs. Thus rather than create a new NDC, it common to add processing power to the ones that exist, but on the other hand, it is expected and common to add new EDCs on a regular basis. Further more, the power of each EDC will be different, dependng on the company or party that designed and built the EDC. The present disclosure takes advantage of the current pattern and expectation that EDCs are being added to the cellular network, that each EDC will have different processing capabilities. The inventive system is designed to recognize and make use of EDCs as they are added and make use of their processing power rather than adding more processors to the NDC's and the RDCs.

In particular, the analytics module 230 will be constantly measuring the usage of each network function in the NDC and speed at which it is accomplished by the processing power within the NDC. In some embodiments, the system will focus on the processing capability usage and potential for performing network functions in a data center other than NDC and determine whether that network function should be carried out in a different data center. For example, under standard operating conditions and sufficient processing power in the NDC, the Cali Session Control Function (CSCF), will be carried out in the NDC. The CSCF is a central component of the IMS network that manages all signaling from the end user to services and other networks for processing of Voice calls, Video Calls, Messaging etc. Thus, the processors present in the NDC might approach being overloaded, for example reach or exceed a selected threshold for an established period of time. The threshold can be a selected value such as operating at 75%, 80% or some percentage of their processing capacity. The time might be in the range of several seconds of not following below the threshold or the average processor use on a selected moving window, for example, the most recent one minute, five minutes or the like. If the demand for a particular network function approaches closely to or reaches 100% of the processing capacity for that particular function at the data center which performing that function, then the flow of data will slow down. The overcapacity of traffic for one function will affect various other functions in the system and the processing and passing of data throughout the entire system will be at less than optimum and it will operate at a slower speed, along with other issues occurring. Accordingly, if a particular network function reaches a selected threshold of the processing power for that function in the first network in which it is instantiated, the system. will look for processing power in other data centers in order to carry out the performance of that particular network function.

The inventors recognized that a greater benefit can be obtained by performing some network functions at an Edge rather dynamically rather than pre-determined, namely at the nearest to the user, rather at the NIX:, which will be distant from the user, than other network functions. For example, some network functions such as UDR (User Data Convergence) or CSCF (Call Session) Control Function) can provide greater benefit being performed at the Edge by an EDC as compared to the SNISF, (Short Message Service Function) being performed in an EDC. Thus, while all three are normally performed at a National Data Center, if the processors there reach the selected threshold of their total capacity (i.e. 75% of their capacity for sustained time period) there will be more benefit obtained by moving the network functions of UDR or CSCF to the Edge to instantiate in the EDC over moving the SMSF to the EDC.

It is to be noted that a wide variety of acronyms are used in the 3GPP system, including in the various versions of 3G, LTE, 4G and 5G. These acronyms are quite numerous and stand for the names of the various network functions are defined by various committees that are part of each standard committee in the various versions of the 3GPP system, whether 3G, 4G, 5G, or 6G, etc. The meaning and operation of such network functions are widely published and well known and understood by persons skilled in the art and, therefore, are not described in detail herein. There are a number of network functions shown in FIG. 2, but all of the various network functions that are part of the IMS network are not shown in FIG. 2. There will be a number of network functions will be present in systems using the inventive disclosure and the failure to list one does not mean it is excluded or cannot be used within the present disclosure. The number of network functions is currently quite large and continues to grow over time, and the 5G network, as well as future versions of 5G and the expected 6G, 7G and 8G, will include additional network functions, but are considered to fall within the claimed subject matter.

The network functions 250, 260, and 270 carried at the respective data centers of NDC, RDC and EDC at which they are shown are selected in advance to run at respective data centers because of the functions they serve can, in most instances, be most efficiently carried out at that particular data center. For example, UPF serves user plane functions, which are closely related to the operation of user equipment, for example, cellphone 12 and IoT 14 are best run on the EDC 20. Thus, the UPF will remain in the EDC whenver possible. The Edge data centers are electrically closer based on the number of switches the signals passes through and also physically closer to the radio tower 16. In come instances, signals between the local user of the IoT 14 and might, in fact, bypass the tower 16 and run directly from the local IoT 14 to the EDC 20. As another example, UDM serves unified data management including user subscription management, customer profile, and encryption keys. It is typically run on an aggregated level on the NDC 22 and this is the most efficient location for it to be carried out based on the number of the other network functions it interacts with.

According to a preferred embodiment, the data lake 240 receives performance data as they occur from EDC 20, RDC 18, and NDC 22. Data lake 240 stores the performance data for analytic module 230 to analyze. Analytic module 230 utilizes the stored performance data from data lake 240, the performance data as the occur from EDC 20, RDC 18, and NDC 22, and various artificial intelligence (AI) and machine learning (ML) techniques to estimate the processing capacity, switching and other resources used on each EDC 20, RDC 18, and NDC 22. The analytic module 230 also determines from the received data where resources are available to instantiate a network function. Resources may include, but are not limited to, computation power, the type or number of processors at a particular data center, the processors functional specification, data storage capabilities, data storage capabilities, latency between endpoints, or favorable electricity cost.

Figure 3A:
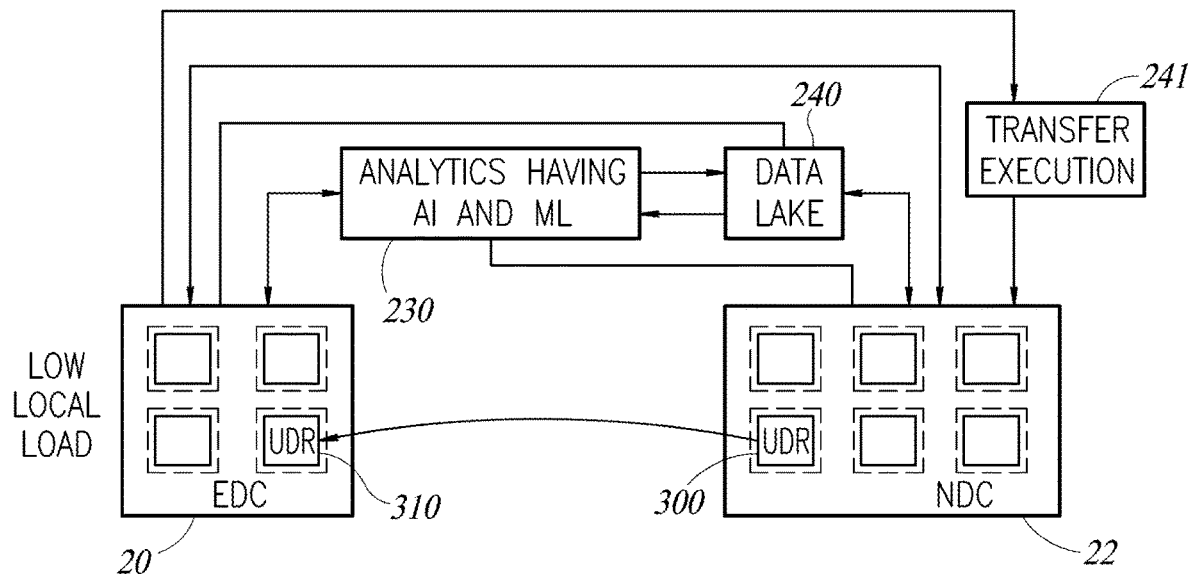
FIG. 3A is a system diagram depicting a load balancing operation from a national data center to an edge data center by instantiation of a selected network function at different data centers.

FIG. 3A shows a network function 300, for example UDR, being load balanced out from NDC 22 to be performed by EDC 20. To carry out this load balancing, the analytic module 230 analyzes and estimates the current and future resource usage in NDC 22 to perform the UDR function. It also performs an analyzes of the current and future resources available and their use in the EDC 20. As the resource becomes less available in NDC 22 and the resource becomes more available in EDC 20, the system will move the performance of the UDR function to the EDC. For example, if the EDC 20 is experiencing less local traffic and/or has surplus computation power whereas NDC 22 is experiencing higher national traffic from other locales, this will be sensed in the analytics module 230. The analytic module 230 determines that it is more appropriate to run a UDR in EDC 20 than to run it in NDC 22. The analytics module 230 sends a command to the transfer execution module 241 for it to take the steps to change the performance of some or all of the UDR network function from the NDC to the EDC. The network function UDR 300 is terminated on NDC 22 and a new instance of UDR is instantiated as network function 310 on EDC 20 to serve users at the locale under the control and timing of the transfer execution function 241. The transfer execution module 241 is coupled to provide network function allocation and control to each of the NDC, RDC and EDC. In some embodiments, the transfer execution function is a separate logic block and executed function form the analytics module 230. In other embodiments, it is carried out within and is considered part of the analytics module 230.

Figure 3B:
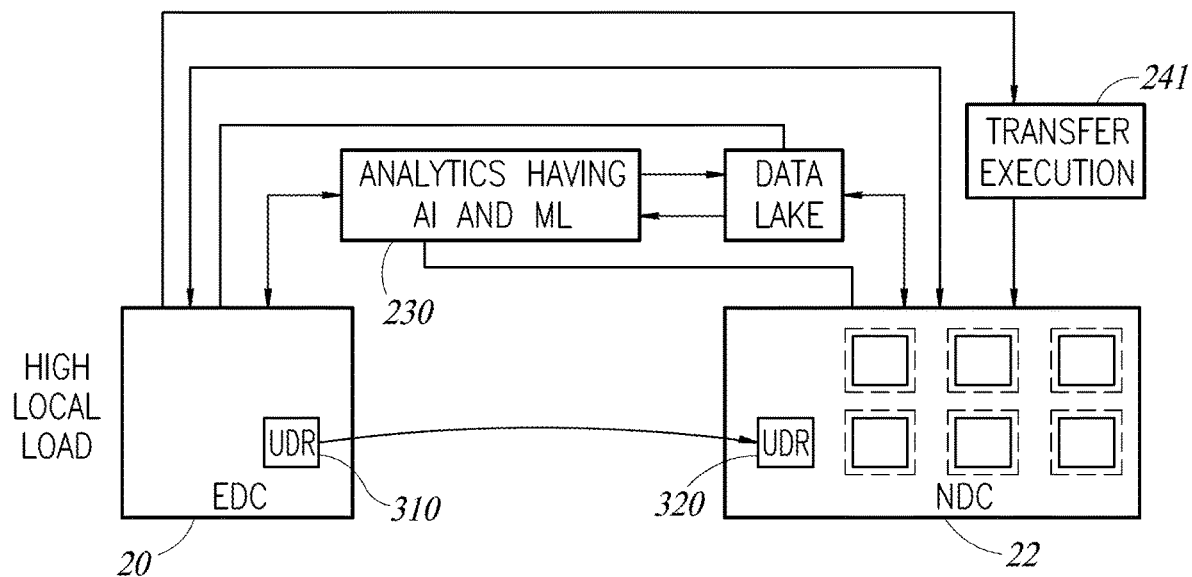
FIG. 3B is a system diagram depicting a load balancing operation from an edge data center to a national data center by instantiation of a selected network function at different data centers.

FIG. 3B shows the network function 320, for example UDR, being load balanced out from EDC 20 to NDC 22. In one embodiment, the analytic module 230 determines that the EDC 20 will experience higher local traffic in the future and there will be little surplus computation power based on stored historical data that is stored in data lake 240. Thus, the analytics module, using artificial intelligence (AI) and machine learning (ML) determines in advance that it will be more appropriate to run UDR in NDC 22 than EDC 20. This occurs a period of time before the EDC increases its traffic to become busy. Based on the prediction done using AI that the EDC will soon become busy and that NDC will have relatively more recourse to perform this UDR network function a new instance 320 of network function UDR is there instantiated on NDC 22 and the instance of the network function 310 of UDR in the EDC is terminated.

One example of the use of AI in this predictive pattern just described will now explained. Based on a long term collection of data by the data lake 240 and analyzing that data in analytics module 230, the system will predict that a large amount of traffic will soon be applied to that particular EDC. This might be based on the time of day, for example, based on a review of the data over multiple days, the analytics 230 notes that this particular EDC becomes very busy starting about 7:30 am and remains busy until 8:45 am, then is busy again from 5:30 p.m. until 7:00 p.m. Or, it may recognize that as a particular RDC near the EDC increases in data usage that shortly thereafter, the EDC will rapidly increase its need for processing capacity. This is recognized even if that particular EDC has not previously been used to perform any other network function. Namely, the data lake 240 will have stored the long term data usage of that EDC over multiple days, weeks or maybe months or years. As the EDC is carrying out the network function of UDR, the analytics module will be reviewing the data in data lake 240 and determine based on other factors, such as time of day, increased traffic on the RDC, increased traffic on certain of functions in the EDC, etc. that a rapid increase in the processing capacity of that EDC will be needed. Therefore, in advance of the processing capacity of the EDC reaching the selected threshold, the transfer execution module 241 will start an instantiation of the UDR 320 in the NDC 22 and then terminate instantiation 310 in the EDC.

Figure 4:
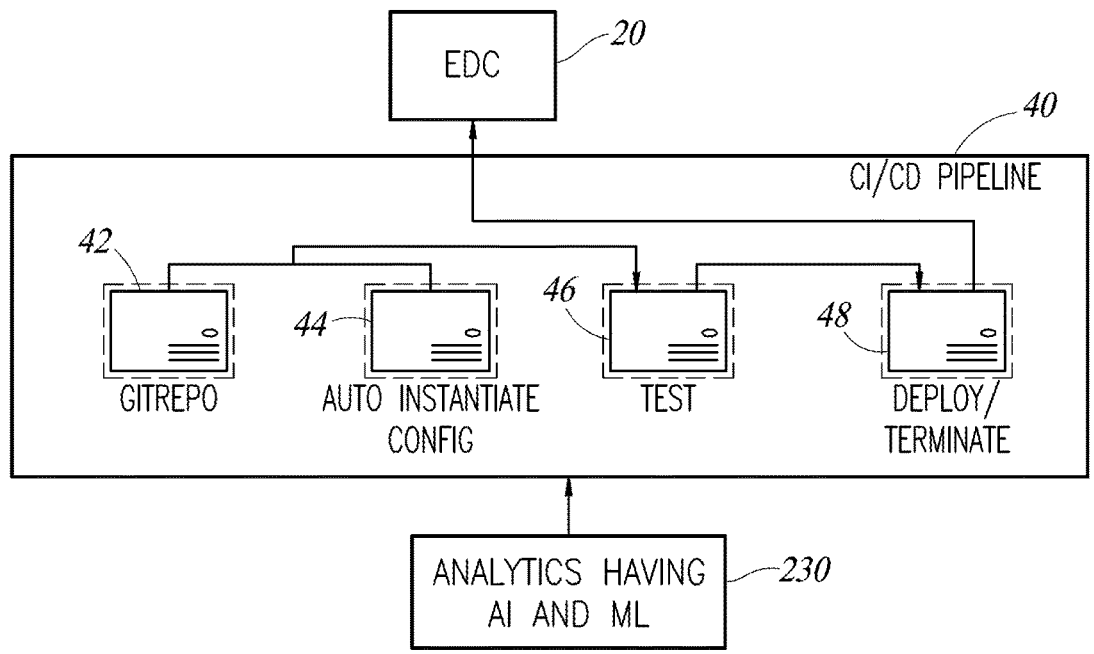
FIG. 4 is a system diagram of a continuous integration, continuous delivery pipeline.

FIG. 4 shows an example of a continuous integration continuous delivery (CI/CD) pipeline 40 according to principles of the present embodiment. The CI/CD pipeline 40 is used in conjunction with analytics module 230, including the AI, to instantiate various network functions in various data centers including, for example, EDC 20. The CI/CD pipeline comprises: a source code repository 42, an automatic instantiation configuration repository 44, a testing framework 46 including a plurality of tests, and a deployment module 48. The CI/CD pipeline 40 is coupled to the analytic module 230 and various data centers, for example, EDC 20. In one embodiment, the source code repository 42 is version controlled, for example, it may use git or svn as the repository management system. The CI/CD pipeline 40 reads a plurality of source code files from code repository 42 and a configuration from the automatic instantiation configuration repository 44. The configuration determines how a network function executable is built by the pipeline 40. In one embodiment, the configuration being read is chosen according to the performance data the analytic module 230 receives. After a network function executable is built, the pipeline 40 will run the executable against a plurality of tests in the test framework 46. These tests ensure performance and integrity of the built executable in the new data center. In one embodiment, the tests the network function executable is run against are determined by the performance data the analytic module 230 receives. Once the executable passes all tests in the test framework 46, it will be deployed by the deployment module 48. In those embodiments in which the CI/CD pipeline is used, the deploy/terminate module 48 will carry out the functions of the transfer execution module 241 and thus it is not needed for that embodiment. The deployment module 48 runs the network function executable on a machine in a selected data center, for example EDC 20. The selected data center is determined by the performance data the analytic module 230 receives. In one embodiment, the deployment module 48 also terminates a running network function executable on a selected data center if the same type of network function is deployed to a different data center.

Figure 5:
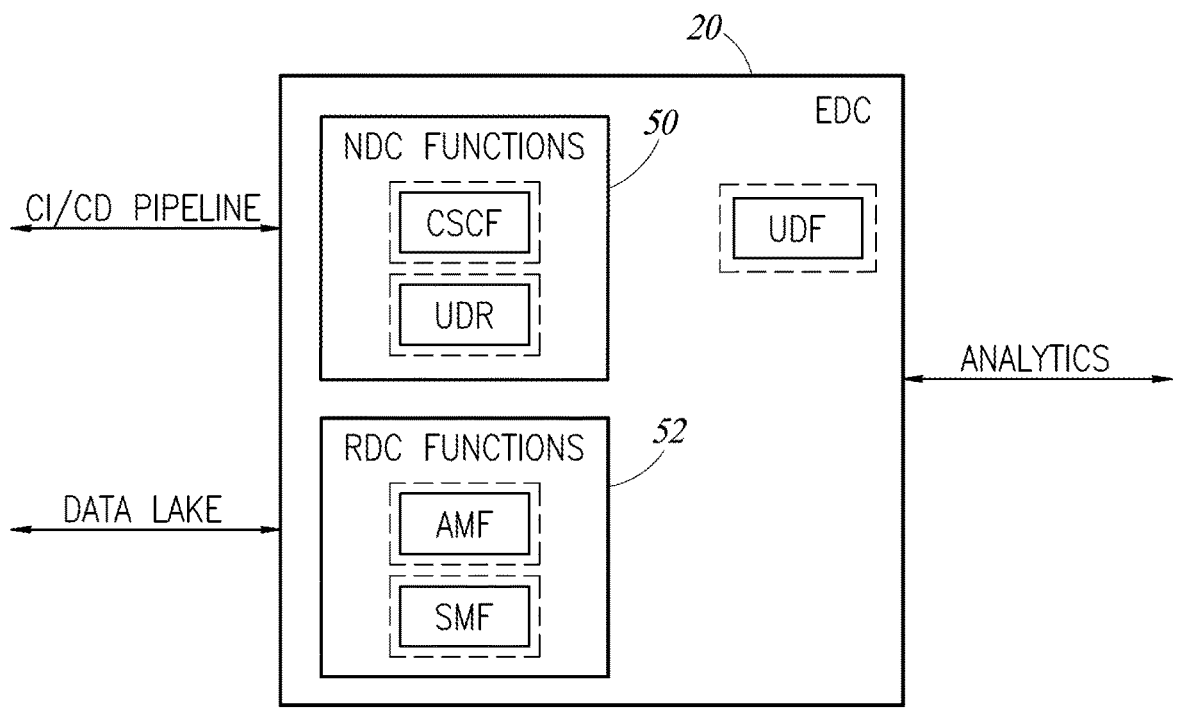
FIG. 5 is a system diagram showing various network functions running on an edge data center.

FIG. 5 shows various network functions running in EDC 20. The cellular network system disclosed in the present application allows network functions 50 that are typically run in NDC 22, such as CSCF or UDR, and network functions 52 that are typically run in RDC, such as AMF or SMF, to be instantiated and run in EDC 20. As shown in FIG. 5, is the EDC has sufficient processing capacity, then more network functions will be instantiated on it.

Figure 6:
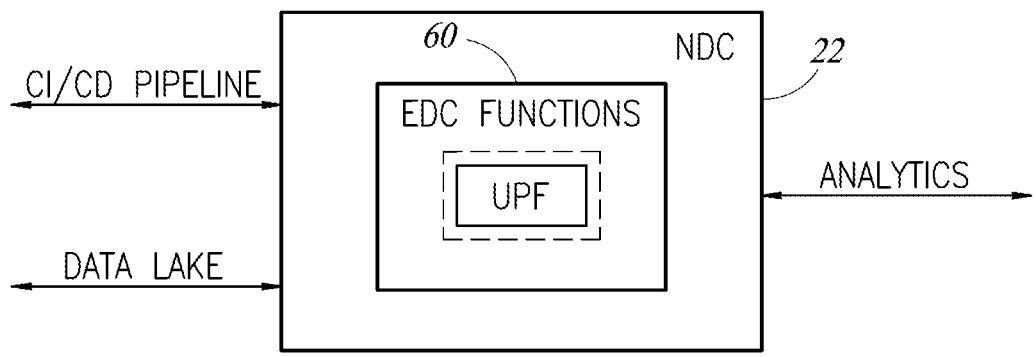
FIG. 6 is a system diagram showing a network function running on a national data center.

FIG. 6 shows a network function 60 of the UPF that is typically run in EDC 20 that is instead being processed and run on the NDC. The cellular network system disclosed in the present application allows the network function 60 of UPF to instantiate and run on NDC 22 if that particular EDC does not have sufficient processing capability. It is more common of an EDC to go down, for example, a processor in the EDC might to go off line, fail or be demanded to other uses. The EDC is more under local control and is not as reliable as an NDC. The analytics module 230 will recognize that a particular EDC does not have sufficient processing capacity to carry out the functions demanded of it and will transfer some or all of the UPF to the NDC. While carrying out the UPF functions 60 in the NDC is not preferred, this is better than having them carried out very slowly or failing in the local EDC. The present embodiment is able to recognize that the preferred relative location to carry out a particular function. such as the UPF and then instantiate it in either the RDC or the NDC, pending on their relative location compared to the EDC, switchng speeds, processing power and the other resources.

Figure 7:
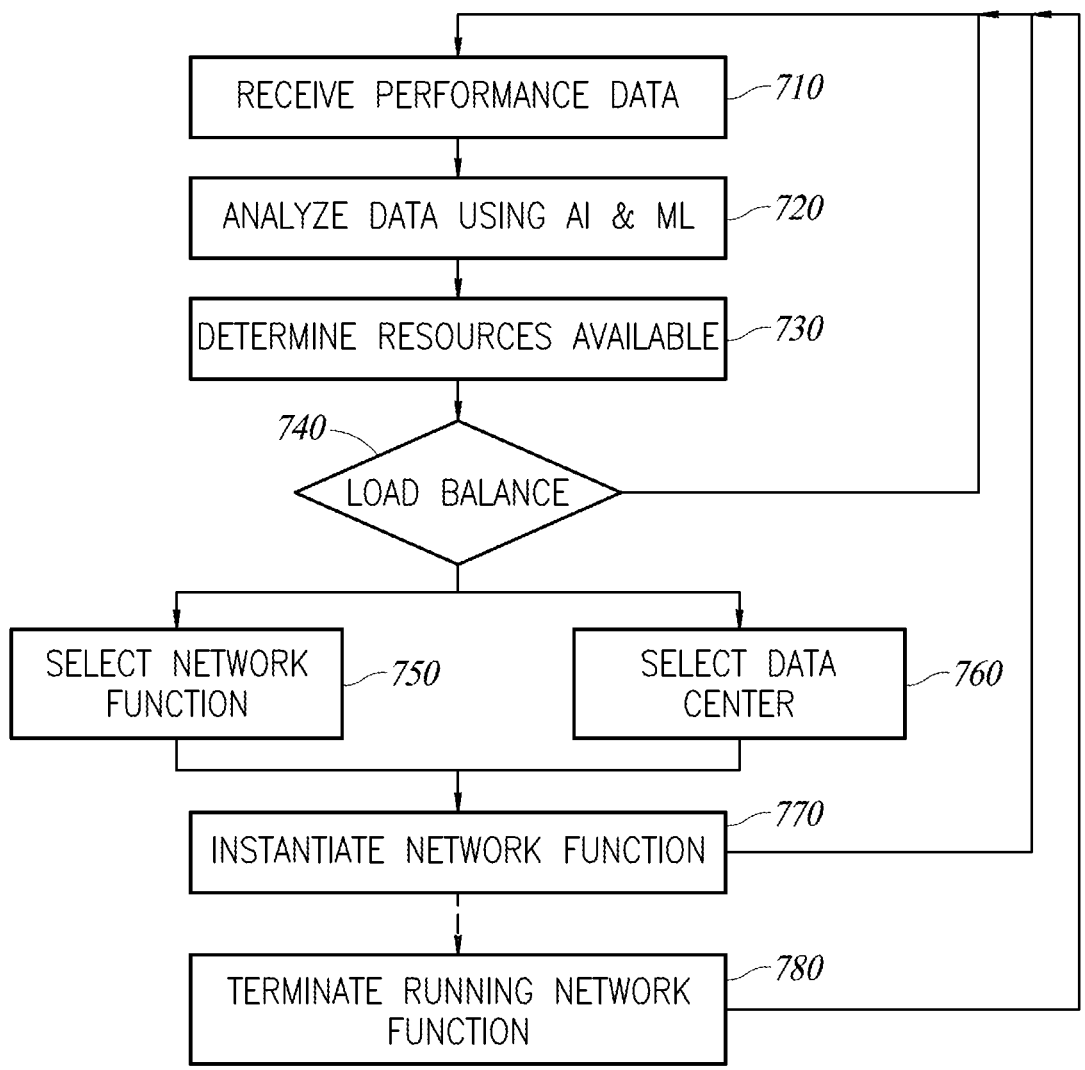
FIG. 7 is a flow chart showing the operation of a load balancing IMS cellular network system.

FIG. 7 shows a flow chart 700 of the operation of the analytic module 230. At step 710 the analytic module 230 receives performance data from data lake 240 and the various data centers. At step 720 the analytic module 230 analyzes the data using AI and ML. The results are used in step 730 where the analytic module determines the resources available in the future for each of the various data centers. In step 740 the analytic module decides if load balancing should be performed to utilize the resources available in the future. If yes, in step 750 the analytic module selects a network function to be instantiated and in step 760 the analytic module selects a data center where the selected network function will be instantiated. In step 770 the selected network function is instantiated in the selected data center. In one embodiment, in optional step 780 the analytic module terminates the selected network function if it was running in a data center that is not the selected data center. After the instantiating the selected network function in the selected data center, the analytic module returns to step 710 to receive performance data.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of dynamically allocating cellular network functions to a variety of different data centers, comprising:
   determining, based on performance data, resources available for the future in at least one of an edge data center, regional data center, or national data center;
   determining a selected data center suitable to run a selected network function based on the performance data; and
   instantiating the selected network function at the selected data center, wherein instantiating the selected network function includes:
      building an executable program of the selected network function from a source code included in a code repository;
      running a plurality of tests against the executable program; and
      delivering the executable program to the selected data center after the tests are run against the executable program.

2. The method according to claim 1, further comprising:
   determining that a first data center currently running the selected network function has usage that reaches or exceeds a selected threshold based on the performance data;
   terminating execution of the selected network function on the first data center; and
   executing the selected network function on a second data center.

3. The method according to claim 2, wherein the first data center is the national data center and second data center is the edge data center.

4. The method according to claim 1, wherein the selected network function is instantiated by a continuous integration and continuous delivery method.

5. The method according to claim 1, wherein the code repository is a version controlled code repository.

6. The method according to claim 1, wherein the selected network function is within the group of: Serving Call Control Function; Telephony Application Server; Diameter Routing Agent; Diameter Edge Agent; Home Subscriber Service; Access Management Function; and Service Control Point, Proxy Call Control Function.

7. The method according to claim 1, further comprising:
   extracting a plurality of features from the performance data; and
   training a model based on the features extracted from the performance data.

8. The method of claim 1 wherein:
   determining the selected data center suitable to run the selected network function based on the performance data includes:
      monitoring the performance data of the national data center and the edge data center over time;
      predicting future performance parameters at each of the national data center and the edge data center based on machine learning analytics applied to the performance data;
      performing a continuous integration continuous delivery (CI/CD) pipeline analysis for a network function to be changed at selected future time;
      generating a capability to perform the selected network function at a different data center based on performing the CI/CD pipeline analysis; and
      changing a location of instantiation of the selected network function at a future time at the different data center.

9. A system, comprising:
   at least one processor; and
   at least one memory storing at least one program that, when executed by the at least one processor, causes the system to:

determine a selected data center to run a selected network function; and instantiate the selected network function at the selected data center by building an executable program of the selected network function from source code included in a code repository, running a plurality of tests against the executable program, and delivering the executable program to the selected data center after the tests are run against the executable program.

10. The system according to claim 9, wherein the at least one program, when executed by the at least one processor, causes the system to:

terminate the selected network function that is running on a second data center.

11. The system according to claim 10, wherein the at least one program, when executed by the at least one processor, causes the system to:

transfer execution of the selected network function from one data center to a different data center.

12. The system according to claim 11, wherein the system instantiates the selected network function at the selected data center and terminates the selected network function that is running on the second data center by executing a single executable program.

13. The system according to claim 11, wherein the selected network function instantiated at the selected data center is a same type as the selected network function terminated that is running on the second data center, the selected data center being a different data center from the second data center.

14. The system according to claim 9, wherein the at least one program, when executed by the at least one processor, causes the system to:

configure an edge data center to execute the selected network function in place of a national data center running a same network function.

15. A cellular network load balancing system, comprising:

a plurality of data centers, including at least two of an edge data center, a regional data center, or a national data center;

wherein a plurality of network functions run on the data centers;

an analytic module coupled to the data centers, wherein the analytic module determines resources available for the future on at least one of the edge data center, regional data center, or national data center, and selects a first data center to run a selected network function, and wherein the selected network function is running on a second data center; and an instantiating module coupled to the analytic module, wherein the instantiating module instantiates the selected network function to the first data center and the instantiating module terminates the selected network function on the second data center, wherein the instantiating module includes:

an executable building module coupled to a code repository, wherein the executable building module builds an executable program of the selected network function from source code included the code repository;

a testing module coupled to the executable building module, wherein the testing module runs a plurality of tests against the executable program; and a delivery module coupled to the testing module, wherein the delivery module delivers the executable program to the first data center after the tests are run against the executable program.

16. The system according to claim 15, wherein the code repository is a version controlled code repository.

17. The system according to claim 15, wherein the executable building module selects a instantiate configuration from a plurality of configurations, and the instantiate configuration is selected based on the resources available determined by the analytic module.

* * * * *